Aug. 14, 1956  G. A. J. VOETELINK  2,758,366
METHOD OF MAKING FLEXIBLE PIPE
Filed Jan. 2, 1951
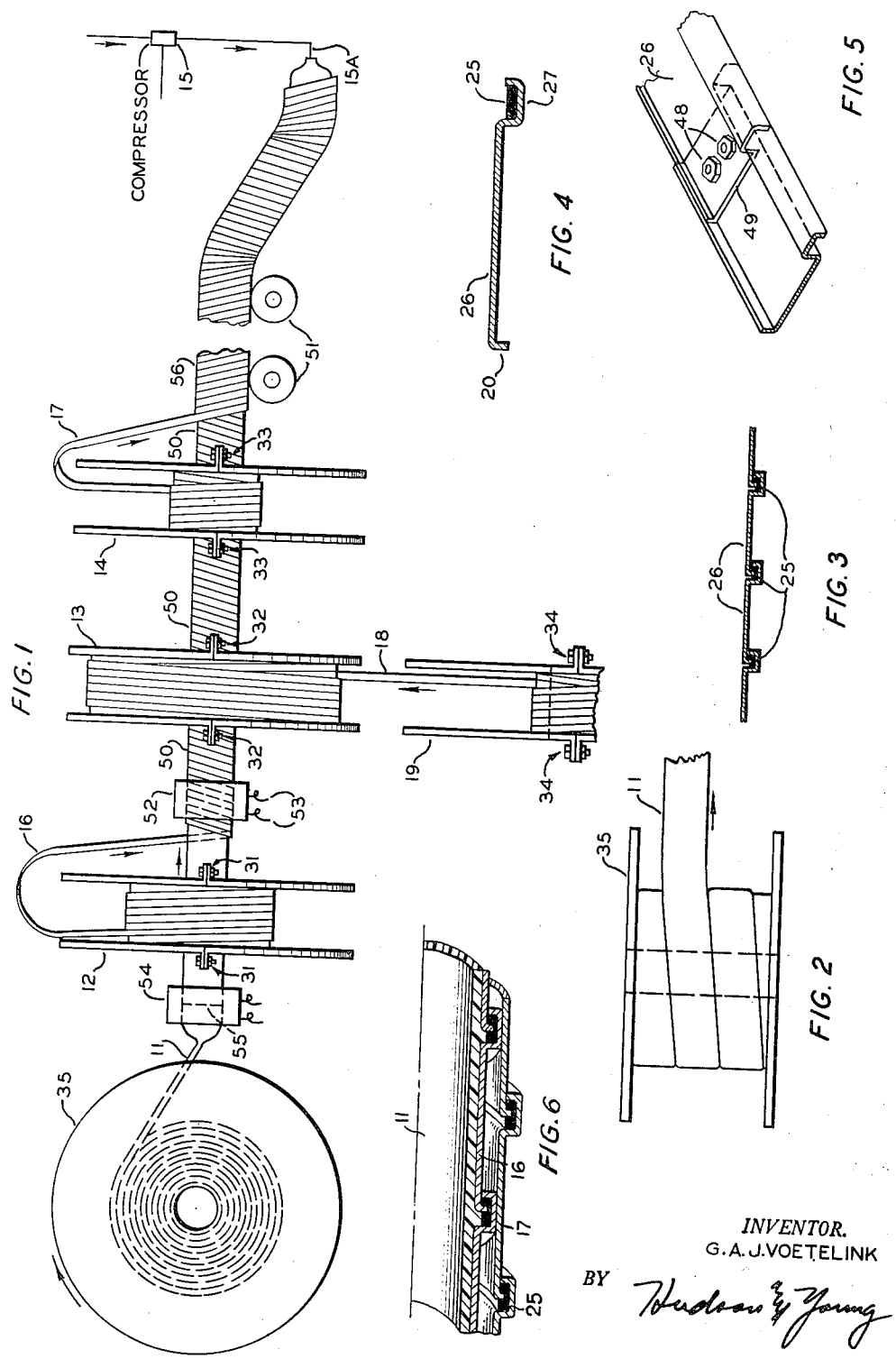
INVENTOR.
G. A. J. VOETELINK
BY
ATTORNEYS

United States Patent Office 2,758,366
Patented Aug. 14, 1956

2,758,366

METHOD OF MAKING FLEXIBLE PIPE

Gustaaf A. J. Voetelink, Bartlesville, Okla., assignor to Phillips Petroleum Company, a corporation of Delaware Application January 2, 1951, Serial No. 203,974

6 Claims. (Cl. 29—435)

This invention relates to flexible pipe and a method for making and assembling flexible pipe. In one aspect it relates to a method for assembling flexible pipe for use in above ground or underground installation. In another aspect it relates to a pipe which can be transported in a relatively small space and then assembled to be a flexible, general utility pipe.

The present method of laying pipe line consists in stringing long joints of metal pipe along a trench. The pipe has, of course, been transported from the steel mill and has occupied a relatively large volume during shipment. This large volume of relatively low weight material presents a particular transportation problem. While this problem is especially acute when shipping pipe long distances, for example, across an ocean, it is also acute even for short distance shipment. It is obvious that for loading pipe sections for transportation that a large portion of the shipping space is empty. Some saving in shipping space can be realized when pipe of several diameters are included in the same shipment. For example, under such conditions a small diameter pipe may be telescoped into a large diameter pipe and thus two lengths of pipe can be shipped in the same volume of shipping space as the one section of large diameter pipe. This telescoping of pipe sections can be carried out to any degree provided it is desired to ship pipe sections of different diameters in the same shipment. However, when laying a long pipe line of pipe of one diameter, this shipping problem is especially acute.

One object of my invention is to devise a flexible pipe which is easy and relatively inexpensive to prepare and to install.

Another object of my invention is to devise a flexible pipe which can be shipped in a minimum of shipping space.

Still another object of my invention is to provide the flexible pipe which can be shipped into a minimum of shipping space and yet which is relatively simple to assemble and install at the place of its use.

Still other objects and advantages of my invention will be realized upon reading the following description which, taken with the attached drawing, forms a part of this specification.

In the drawing Figure 1 represents, diagrammatically, one form of my pipe and apparatus for assembling same. Figure 2 is a plan view of a portion of the apparatus of Figure 1. Figures 3, 4 and 5 show portions of my pipe assembly on an enlarged scale. Figure 6 is a longitudinal view in section of the finished pipe of Figure 1.

My flexible pipe consists mainly of the flexible and collapsible tubing. This collapsible tubing may be of any desired and usable type of resilient material. A satisfactory material for use under some circumstances would be a rubber or rubber-like material, or a flexible plastic material. The thickness of the walls of this flexible material is dependent somewhat upon the pressure to be maintained in the pipe line and the diameter of the pipe. It is obvious that for a pipe of relatively large diameter that the thickness of the pipe walls should be greater.

Such a rubbery or plastic tubing 11 is rolled upon a spool or reel 35, at the factory. When the reel or spool 35 is relatively large a considerable length of the tubing 11 can be wound thereupon. One of the main advantages of the tubing or pipe of my invention is that considerably longer sections of the tubing 11 can be used at the point of installation than when a conventional steel pipe is used. When using conventional steel pipe these pipe sections may vary from 20 to 40 feet in length. Considerable labor is required in splicing such pieces of pipe. When considering that conventional pipe may be from 20 to 40 feet in length the splicing or joining operation is one of the big operations of a pipe laying project. In my invention the tubing lengths or sections 11 may be 1000 or more feet in length. When laying the pipe of relatively small diameter and when using a spool 35 of relatively large size as much as several thousand feet or more of tubing may be rolled on a reel in a manner similar to the rolling of a cotton fire hose on a reel. The advantage is that the tubing 11 when rolled upon the reel is in a collapsed condition and accordingly relatively large sections of tubing can be rolled upon a spool for transportation.

A large portion of the pipe line assembling apparatus can be transported on, for example, one truck or all on two trucks. For purposes of simplicity, a truck or other mounting and transporting means is not shown in the drawing. However, when one truck is used for transporting the assembly apparatus, the reel or spool 35 is mounted on a shaft at a point just behind the cab. This reel 35 is mounted in such a manner that the reel may turn as the tubing 11 is used in the pipe laying operation. In beginning the pipe laying operation the tubing 11 is threaded through the reels 12, 13, and 14 and is extended beyond this last reel 14 to such a point at which a compressor 15 may be installed and connected to the end of the tubing for inflation purposes. One of the main points in installing this pipe is that at some point along the pipe a compressor or other means should be provided for inflating the tubing so as to hold it in a circular or other shape so that subsequent steps in wrapping the tubing may be properly accomplished. In the drawing I have shown a compressor 15 at the beginning end of the pipe and attached thereto is a pipe 15a leading from the compressor 15 to the end of the tubing 11. During the installing operation this compressor 15 operates to pump air into the tubing to such a pressure as will be required for maintaining the tubing in a circular shape.

As may be seen from Figure 1 the tubing 11 is wrapped with two layers of wrapping materials. The first layer of this wrapping material or ribbon 16 is provided from the reel 12 which surrounds the tube 11. For starting the operation at the beginning of a pipe laying project the reel 12 may be filled with the ribbon-type material with which it is desired to wrap the tubing. Such a ribbon-like material 16 is shown in detail in Figures 3 and 4. In one preferred embodiment this ribbon material 16, as illustrated in Figure 4, is composed of a ribbon 26 containing the flange 20 on one edge and the groove 27 along the other edge. In the embodiment a ribbon illustrated in Figure 4, it is desired to wrap the side of the ribbon to which the reference numeral 26 is attached next to the plastic tubing 11. In this manner the relatively smooth surface is exposed to the plastic tubing 11. From the nature of the ribbon or covering material 26 it is seen that when this wrapping material is wrapped around the tubing 11 the flange 20 will be imbedded in gasket 25 in the groove 27. Thus, by continous wrapping of this type of wrapping material around the tubing 11 a relatively tight and protective, yet flexible, coating is supplied to the tubing. When this wrapping material is composed of, for example, an iron or steel ribbon product, then the layer of wrapping is very hard and resistant to shock or other external forces and a very substantial and rigid pipe is provided. At the same time the pipe is flexible since the gasket 25 provides an elastic surface against which the flange 20 is held in such a manner that some "give" is provided in case the pipe line is to be installed around a curve. At the same time when the flange 20 contacts the gasket 25 in the groove 27 a relatively water-tight joint is provided. When such a pipe is intended to be installed underground or even aboveground in an unprotected manner the ribbon 26 may be made of a galvanized product so as to be resistant against corrosion. Of course, stainless steel may be used, but usually cost of such material is sufficiently high to make its use except in special cases prohibitive.

When the first layer of wrapping has been applied to the tubing 11 a second layer of wrapping 56 similar to the first layer is applied to the tubing. The material for this second layer of wrapping is provided from reel 14 as element 17. It is preferable to apply the wrapping material 17 to the tubing in the direction opposite to the wrapping material 16. By applying these two wrappings in opposite directions makes for a much more substantial pipe. This wrapping material 17 may be just exactly like the wrapping material 16 as was illustrated in Figure 4 of the drawing. A groove is provided at one side while a flange is provided at the opposite side of the ribbon for sealing with the gasket in the groove for providing a flexible second covering on the tubing. Means for rotating the reel 12 in one direction is, of course, provided on the bed of the pipe line laying truck. In like manner means for rotating the reel 14 in the direction opposite to that of the reel 12 is also provided. More than two layers of wrapping material may be used in place of the two layers herein described if desired.

From Figure 1 of the drawing it is seen that the reel 14 is shown as being nearly empty of its wrapping material 17. The reel 12 is nearly full. It may also be seen that the reels 12, 13, 14 and 19 are shown as being made up of two halves bolted together. Reel 12 is bolted together by bolt and flange assemblies 31, reel 13 by flange and bolt assemblies 32, reel 14 by similar assemblies 33 while reel 19 is held together by assemblies 34. The reels are shown as constructed in this manner for the express purpose that when a reel is empty the two halves may be unbolted and the reel removed from around the tubing 11. For example, since reel 14 is shown in Figure 1 as being nearly empty of the wrapping material 17 when this reel becomes empty the bolt and flange assemblies 33 are removed and the two halves of the reel 14 removed from about the tubing. Reel 13 has previously been filled with this same wrapping material 17 so that when reel 14 is removed reel 13 may be moved from left to right to replace the empty reel 14. When reel 13 has replaced reel 14 the empty reel 14 may then be bolted onto the tubing 11 at the point which previously was occupied by the reel 13. At this location the empty reel 14 is filled with a wrapping material 18 such as will be needed for the first wrapping around the tubing 11 when the reel 12 has become empty. When the reel 12 becomes empty the bolt and flange assemblies 31 are removed and this reel 12 is taken from the tubing 11. The reel 14 which was repositioned at the point previously occupied by reel 13 is now filled with the new wrapping material 18 from the extraneous reel 19 which in turn may be mounted on a separate truck or conveyance. When this reel 14 has been filled with this new wrapping material 18 and when reel 12 is empty and removed from its operation position the filled reel 14 may be slid from its filling position to a point previously occupied by reel 12. Figure 5 illustrates one means of splicing the ends of the wrapping material. This means of splicing the ends of two pieces of wrapping materials is relatively simple and consists in the providing of bolt holes through which bolts 48 may be inserted. If desired, a resilient gasket 49 may be provided between the two ribbon ends. The ribbons may be welded together, riveted or attached to each other by a self-locking means as well as by the bolts 48. With the filled reel replacing the empty reel 12 and with making the splice as just described, the empty reel 12 may then be repositioned around a tubing 11 at the point previously occupied by reel 14 during its filling operation. With the empty reel 12 installed in the filling position this reel may be filled with a wrapping material similar to that used for the external wrapping of the tubing. And again when the reel positioned at point 14 is empty this reel may then be unbolted and removed from around the tubing and the newly filled reel slid from left to right into an operating position. A similar splice may be made at this point to attach the ends of the wrapping materials.

When the reel 35 containing the collapsible tubing 11 has become empty of its wrapping material the empty reel may be replaced by a full one. The end of the new section of tubing 11 will then need to be attached to the end of the tubing just removed from the reel 35. In case the flexible material of which the tubing 11 is made is for example a rubbery material, then the ends of these tubings may be joined by a vulcanizing operation. Element 54 is intended to be an apparatus for applying heat for the vulcanizing of the ends of the tubing 11. In case the tubing 11 is made of a plastic material then the element 54 may be a heating means for applying heat for securing or polymerizing a cementing material in order to join the ends of the tubing 11. In Figure 1 the splicing or joining ends of tube 11 is identified by reference numeral 55. Rigid rings may be attached to the ends of tubing 11 for splicing purposes.

Since the flexible tubing material of which the tubing 11 is made may when pressure is not maintained in the tubing collapse it may be desired to attach in some manner the flexible tubing 11 to the first coat of wrapping material. When tubing 11 is made of plastic material the means 52 for supplying heat may be provided for imbedding the first layer of wrapping material into the plastic tubing. Since pressure is maintained inside tubing 11 during these assembling operations, then when heat is applied through element 52 the plastic may be forced into intimate contact with the inner surface of the wrapping layer. With some bond obtained in this manner between the surface of the plastic tubing 11 and the inner surface of the first wrapping layer, then when the pipe line is not being used and no pressure exists within the line the flexible tubing 11 will not collapse. If so desired, the heating means 52 may be an induction heating apparatus. In case it is an electrical heater wires 53 are provided for conducting electricity from a source, not shown, to the heating apparatus 52. After the second layer of wrapping material has been applied the pipe then is ready and prepared for installation in its underground position in case it is to be buried. Some rolls 51 are provided for permitting careful lowering of the prepared pipe into its position in the bottom of the trench or along the surface of the ground.

In Figure 6 is illustrated in longitudinal section, the construction of finished flexible pipe made as herein disclosed. No outer and inner layers of metal ribbons, 17 and 16, respectively, are shown in position on the surface of the plastic tubing 11. This figure illustrates tubing 11 closely conforming to the inner surface of the inner layer of metal ribbon 16, as produced by heat from heating element 52 with air pressure inside the tubing.

One of the main advantages of this type of pipe for transportation of fluid materials is that assembling and laying of the pipe is relatively simple. The pipe is flexible and after the several layers of wrapping material have been applied the finished pipe is lowered into its trench merely by moving of the equipment carrying the assembling apparatus. Under some conditions the actual installing apparatus, as for example, reels 35, 12, 13, and 14 may be mounted on the bed of one assembly truck. However, when this apparatus is large, the reels 35 and 12, for example, may be mounted upon the body of a truck while the reels 13 and 14 may be mounted on the bed of a platform trailer. A second and service truck will also need be provided for bringing up the filled reels 35 and filled reels 19 containing the wrapping ribbons and for carrying away from the point of operation the empty reels. The pipe assembling and wrapping apparatus of my invention may also be mounted on a barge or boat for laying in water.

In the embodiment of my invention herein described, I have described the use of a compressor for supplying air as the inflating material to be used in tubing 11 in the wrapping operation. The use of the air is not critical and a liquid such as water may be the inflating material if so desired. In this case, then, the compressor 11 will be replaced by a pump for supplying water. Whether water or air is used for supplying pressure in tubing 11 will depend somewhat upon local conditions. The use of water may be a little more advantageous from an operational point of view yet finding a source of water may be a problem under certain conditions. Such a condition under which the source of water might not be readily obtained would be in a desert-like area. Under such conditions, of course, then it is preferable to use air for inflating the tubing during the installing operation.

The above described embodiments are given for illustrative purposes and should not be regarded as limiting my invention, the scope of which is set forth in the following claims.

I claim:

1. A method for producing a flexible pipe assembly comprising inflating a collapsible cylindrical tube of resilient material by injecting air thereinto, wrapping a first metal ribbon having a flange along one edge and a groove along its other edge, spirally around and in direct contact with the inflated tube so that the flange of one turn extends into the groove of the next subsequent turn of ribbon in such a manner as to interlock each pair of successive turns of the ribbon, embedding the inflated tube into said first spiral metal ribbon by heating said tube and first metal ribbon, wrapping a second metal ribbon, having a flange along one edge and a groove along its other edge, spirally around and in contact with said first ribbon in the opposite direction to that of said first ribbon, and so that the flange of one turn extends into the groove of the next subsequent turn of said second ribbon in such a manner as to interlock each pair of successive turns of this ribbon, venting said air from said tube and recovering the metal windings and embedded tube as the flexible pipe assembly.

2. A method for producing a flexible pipe assembly comprising inflating a collapsible tube of resilient material by injecting air thereinto, wrapping a first metal ribbon, having a flange along one edge and a groove along its other edge, spirally around and in direct contact with the inflated tube so that the flange of one turn extends into the groove of the next subsequent turn of ribbon in such a manner as to interlock each pair of successive turns of the ribbon, embedding the inflated tube into said first spiral metal ribbon by heating said tube and first metal ribbon, wrapping a second metal ribbon, having a flange along one edge and a groove along its other edge, spirally around and in contact with said first ribbon in the opposite direction to that of said first ribbon, and so that the flange of one turn extends into the groove of the next subsequent turn of said second ribbon in such a manner as to interlock each pair of successive turns of this ribbon, venting said air from said tube and recovering the metal windings and embedded tube as the flexible pipe assembly.

3. A method for producing a flexible pipe assembly comprising unwinding a flexible and resilient collapsed tube from a first reel, inflating this tube by injecting a fluid thereinto, passing the inflated tube through the central opening of a rotating second reel, from this rotating second reel unwinding a first metal ribbon having a flange along one edge and a groove along its other edge, winding this first ribbon spirally around and in direct contact with the inflated tube so that the flange of one turn extends into the groove of the next subsequent turn in such a manner as to interlock each pair of successive turns of said ribbon, embedding this first layer of wrapping material into the inflated tube by heating said tube and the spirally wound first ribbon, passing the so-heated inflated tube and ribbon winding through the central opening of a rotating third reel, from this rotating third reel unwinding a second metal ribbon having a flange along one edge and a groove along its other edge, winding this second ribbon spirally around and in contact with the first ribbon in the opposite direction to that of said first ribbon so that the flange of one turn extends into the groove of the next subsequent turn of said second ribbon in such a manner as to interlock each pair of successive turns of the ribbon, venting said air from said tube and recovering the metal windings and embedded tube as the flexible pipe assembly.

4. The method of claim 3 wherein the flexible tube is a plastic and said ribbons are galvanized, rust-proof metal ribbons.

5. A method for producing a flexible pipe assembly comprising unwinding a flexible and resilient collapsed tube from a first reel, inflating this tube by injecting a fluid thereinto, passing the inflated tube through the central opening of a rotating second reel, from this rotating second reel unwinding a first metal ribbon having a flange along one edge and a groove along its other edge, winding this first ribbon spirally around and in direct contact with the inflated tube so that the flange of one turn extends into the groove of the next subsequent turn in such a manner as to interlock each pair of successive turns of said ribbon, embedding this first layer of wrapping material into the inflated tube by heating said tube and the spirally wound first ribbon, passing the so-heated inflated tube and ribbon winding through the central opening of a rotating third reel, from this rotating third reel unwinding a second metal ribbon having a flange along one edge and a groove along its other edge, winding this second ribbon spirally around and in contact with the first ribbon in the opposite direction to that of said first ribbon so that the flange of one turn extends into the groove of the next subsequent turn of said second ribbon in such a manner as to interlock each pair of successive turns of the ribbon, positioning a fourth reel around said inflated tube and first ribbon winding, winding a third ribbon having a flange on one side and a groove on the other side on said fourth reel from a fifth reel, when said second reel becomes depleted of said first metal ribbon, removing the depleted second reel from around the inflated tube and substituting therefor said fourth reel, venting air from said tube and recovering the metal windings and embedded tube as the flexible pipe assembly.

6. The method of claim 5 wherein the flexible tube is a plastic and the metal ribbons are galvanized, rust-proof metal ribbons.

References Cited in the file of this patent

UNITED STATES PATENTS

| | | |
|---|---|---|
| Re. 13,568 | Cobb | May 27, 1913 |
| 285,576 | Coas | Sept. 25, 1883 |
| 513,799 | Lombard | Jan. 30, 1894 |
| 542,300 | Witzenmann | July 9, 1895 |
| 796,378 | Waterman | Aug. 1, 1905 |

(Other references on following page)

UNITED STATES PATENTS

| | | | |
|---|---|---|---|
| 817,059 | Greenfield | Apr. 3, | 1906 |
| 919,001 | Greenfield | Apr. 20, | 1909 |
| 935,254 | Gleason | Sept. 28, | 1909 |
| 1,004,643 | Gilson | Oct. 3, | 1911 |
| 1,136,329 | Goodall | Apr. 20, | 1915 |
| 1,353,186 | Sleeper | Sept. 21, | 1920 |
| 1,668,758 | Bryant | May 8, | 1928 |
| 1,671,951 | Angell | May 29, | 1928 |
| 1,913,327 | Barnes | June 6, | 1933 |
| 2,168,067 | Jones | Aug. 1, | 1939 |
| 2,262,514 | Pape | Nov. 11, | 1941 |
| 2,430,081 | Roberts et al. | Nov. 4, | 1947 |
| 2,524,679 | Roberts | Oct. 3, | 1950 |
| 2,600,630 | Fergusson | June 17, | 1952 |

FOREIGN PATENTS

| | | | |
|---|---|---|---|
| 177,690 | Great Britain | Apr. 6, | 1922 |
| 227,373 | Great Britain | Jan. 15, | 1925 |
| 107,497 | Austria | May 15, | 1927 |